US012670710B2

(12) United States Patent
Xue et al.

(10) Patent No.: US 12,670,710 B2
(45) Date of Patent: Jun. 30, 2026

(54) METHOD AND APPARATUS FOR USING TRANSFER LEARNING TO LOCATE IGNEOUS CARBONATE ROCK-TYPE RARE EARTH DEPOSITS

(71) Applicants:Guoqiang Xue, Beijing (CN); Pengfei Lv, Beijing (CN); Weiying Chen, Beijing (CN); Ya Xu, Beijing (CN); Xin Wu, Beijing (CN); Jian Wang, Beijing (CN); Xianhua Li, Beijing (CN)

(72) Inventors: Guoqiang Xue, Beijing (CN); Pengfei Lv, Beijing (CN); Weiying Chen, Beijing (CN); Ya Xu, Beijing (CN); Xin Wu, Beijing (CN); Jian Wang, Beijing (CN); Xianhua Li, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 371 days.

(21) Appl. No.: 18/197,082

(22) Filed: May 14, 2023

(65) Prior Publication Data

US 2024/0378883 A1     Nov. 14, 2024

(51) Int. Cl.
*G06V 20/10* (2022.01)
*G06V 10/26* (2022.01)
(Continued)

(52) U.S. Cl.
CPC .............. *G06V 20/10* (2022.01); *G06V 10/26* (2022.01); *G06V 10/70* (2022.01); *G06V 20/60* (2022.01)

(58) Field of Classification Search
CPC ............................... G06V 20/10; G06V 10/70
See application file for complete search history.

(56) References Cited

U.S. PATENT DOCUMENTS 11,734,914 B1 * 8/2023 Li ........................... E21B 49/00
                                                382/181
2022/0101055 A1 * 3/2022 Yang ........................ G06T 5/70
(Continued)

FOREIGN PATENT DOCUMENTS

CN         116976445 A  * 10/2023
CN         119556366 A  *  3/2025
KR         102549885 B1 *  7/2023

OTHER PUBLICATIONS

W. Wang and Q. Cheng, "Mapping Mineral Potential by Combining Multi-Scale and Multi-Source Geo-Information," IGARSS 2008—2008 IEEE International Geoscience and Remote Sensing Symposium, Boston, MA, USA, 2008, pp. II-1321-II-1324, doi: 10.1109/IGARSS.2008.4779247. (Year: 2008).*

*Primary Examiner* — Gandhi Thirugnanam

(57) ABSTRACT

The present application proposes a method and apparatus for transfer learning-based localization of igneous carbonate-hosted rare earth mineralization. The technology relates to electromagnetic exploration and includes obtaining exploration data for electric, magnetic, seismic, and gravity methods in the target area. Transfer learning-based localization is applied to the electric, magnetic, seismic, and gravity exploration data to determine the cross-sectional map corresponding to the anomalous position of igneous carbonate-hosted rare earth mineralization in the target area. Feature decomposition dimensionality reduction, feature enhancement, and weighted fusion processing are applied to the cross-sectional map, followed by segmentation of the igneous carbonate-hosted rare earth mineralization geological body in the fused image to obtain the spatial distribution of the detection (Continued)

Obtain geophysical exploration data, including electrical, magnetic, seismic, and gravity surveys, of the target area to be evaluated. Conduct transfer learning-based localization on the geophysical exploration data to determine the cross-sectional view of the location of anomalous data related to the origin of the igneous carbonate-type rare earth deposits in the target area.

101

Perform feature analysis dimension reduction, feature enhancement, and weighted fusion processing on the respective sectional images.

102

Segment the spatial occurrence of the igneous carbonate-type REE mineralized geological body in the fused image to obtain the spatial occurrence morphology of the detection target.

103 target. The integrated analysis of multi-source geophysical data using images improves the accuracy of identification and localization of igneous carbonate-hosted rare earth mineralization.

7 Claims, 5 Drawing Sheets

(51) Int. Cl.
   _G06V 10/70_          (2022.01)
   _G06V 20/60_          (2022.01)

(56)                References Cited

U.S. PATENT DOCUMENTS

2022/0187227  A1*   6/2022   Hokstad .................. G01V 11/00
2024/0378883  A1*   11/2024  Xue ........................ G06V 20/10

* cited by examiner

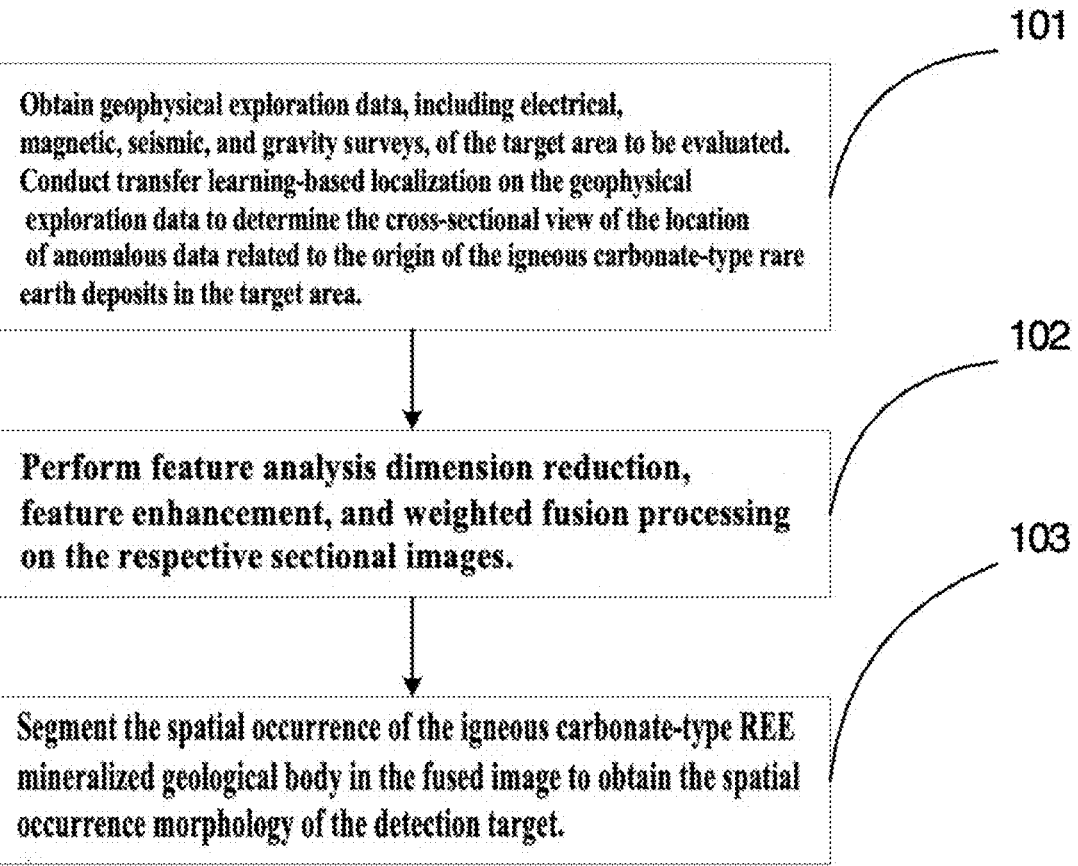

101

Obtain geophysical exploration data, including electrical,
magnetic, seismic, and gravity surveys, of the target area to be evaluated.
Conduct transfer learning-based localization on the geophysical
exploration data to determine the cross-sectional view of the location
of anomalous data related to the origin of the igneous carbonate-type rare
earth deposits in the target area.

102

Perform feature analysis dimension reduction,
feature enhancement, and weighted fusion processing
on the respective sectional images.

103

Segment the spatial occurrence of the igneous carbonate-type REE
mineralized geological body in the fused image to obtain the spatial
occurrence morphology of the detection target.

Fig 1

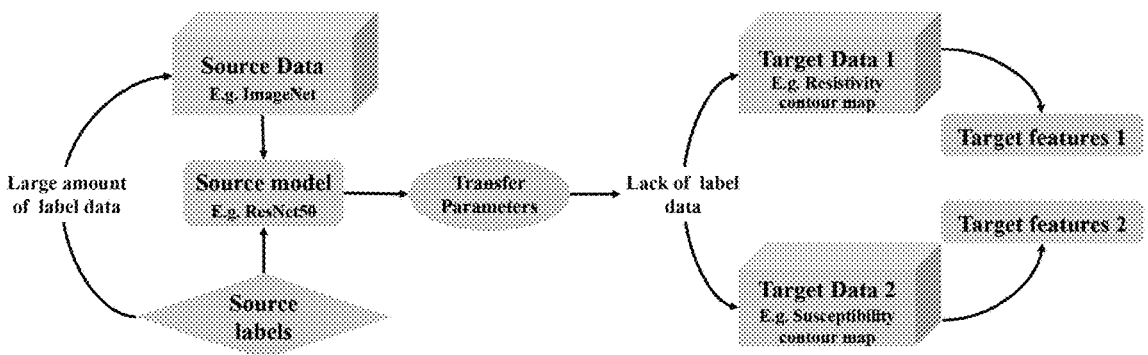

(a) Slice Image (c) Initial features (d) Spearson correlation coefficient (e) Processed features (f) Processed feature Preprocessing      ResNet50

(b) Input Image

Channel 515      ZCA (g) Enhanced feature

Channel 525

Channel 515

Fig. 3

$$S^k_{l,s}(x,y) = \frac{\sum_{p=x-l}^{x+l}\sum_{q=y-l}^{y+l}\left\|\hat{F}^k_{l,s,c}(p,q)\right\|}{(2l+1)\cdot(2l+1)}$$

nuclear-norm $\hat{F}^1_{l,s,c}$ $S^1_{l,s}$ $S^2_{l,s}$

Bicubic interpolation $w \times h$      $W \times H$

Resize

Soft Max $$\omega^k_l(x,y) = \frac{S^k_l(x,y)}{S^1_l(x,y)+S^2_l(x,y)}, k \in \{1,2\}$$

$\hat{F}^2_{l,s,c}$ $\omega^1_l$ $\omega^2_l$

Nuclear-norm

Fig. 4

Source task: classification                    Target task: Feature extraction

Source Data
E.g. ImageNet

Target Data 1
E.g. Resistivity contour map

Target features 1

Large amount of label data

Source model
E.g. ResNet50

Transfer Parameters

Lack of label data

Target features 2

Source labels

Target Data 2
E.g. Susceptibility contour map

Fig. 5

METHOD AND APPARATUS FOR USING TRANSFER LEARNING TO LOCATE IGNEOUS CARBONATE ROCK-TYPE RARE EARTH DEPOSITS

FIELD OF THE INVENTION

The present invention relates to the technical field of geophysical exploration of igneous carbonate rock-type rare earth deposits. More specifically, it pertains to a method and apparatus for using transfer learning to locate igneous carbonate rock-type rare earth deposits.

BACKGROUND OF THE INVENTION

Rare earths, also known as "industrial vitamins," have excellent physical properties such as light, electricity, and magnetism. They are widely used in cutting-edge technology fields such as national defense, aerospace, low-carbon energy, and special materials. Rare earths are of great strategic significance to national security, the national economy, and high-tech development, and are strategic mineral resources that countries around the world are competing for.

The morphology of igneous carbonate rock-type rare earth deposits is complex. As a typical mantle-derived magmatic rock, it is formed under extensional tectonic background and is mainly related to continental rifts, mantle plumes, or large-scale strike-slip faults. The composition of carbonate rocks varies greatly. In addition to typical calcite carbonate rocks, dolomite carbonate rocks, and dolomite-calcite carbonate rocks, there are also various carbonate rocks with rich magnetite and fluorite, as well as rich biotite.

Due to the complex rock composition and uneven spatial distribution of ore-bearing carbonate rocks, and the varied tectonic shapes of ore-bearing carbonate rocks and surrounding rock slate/sandstone affected by tectonic movement, with steep dip angles and rapid lateral lithological changes, effective geophysical exploration methods and refined resolution of geophysical data processing inversion are the key issues for the distribution characteristics of carbonate rock deposits.

INVENTION SUBJECT MATTER

The present invention provides a method and device for transfer learning-based positioning of rare earth minerals of igneous carbonate rocks, which comprehensively analyzes multi-source geophysical data using images as carriers, and improves the accuracy of identification and positioning of rare earth minerals of igneous carbonate rocks.

To achieve the above-mentioned object, the technical solution adopted by the present invention includes:

A transfer learning-based positioning method for rare earth minerals of igneous carbonate rocks, including:

Obtaining electric, magnetic, seismic, and gravity exploration data of the target area to be estimated; performing transfer learning-based positioning on the electric, magnetic, seismic, and gravity exploration data to determine the sectional images corresponding to the abnormal positions of rare earth minerals of igneous carbonate rocks in the target area;

Performing feature decomposition and dimensionality reduction, feature enhancement, and weighted fusion processing on the sectional images;

Segmenting the occurrences of rare earth mineralized geological bodies in the fused images to obtain the spatial occurrence morphology of the detection target.

Preferably, performing transfer learning-based positioning on the electric, magnetic, seismic, and gravity exploration data includes:

Analyzing the electric, magnetic, seismic, and gravity exploration data to obtain the data volumes corresponding to abnormal electrical resistivity, magnetization, velocity, and density of rare earth minerals of igneous carbonate rocks; and positioning the data volumes corresponding to abnormal electrical resistivity, magnetization, velocity, and density.

Preferably, the sectional images corresponding to the abnormal positions of the data anomalies include: digital sectional images of abnormal electrical resistivity, magnetization, velocity, and density.

Preferably, determining the sectional images corresponding to the abnormal positions of rare earth minerals of igneous carbonate rocks in the target area includes:

Generating digital sectional images of abnormal electrical resistivity, magnetization, velocity, and density of the data volumes corresponding to the abnormal positions of rare earth minerals of igneous carbonate rocks, respectively, at the same depth;

Configuring the digital sectional images of abnormal electrical resistivity, magnetization, velocity, and density in a common coordinate system.

Preferably, performing image feature decomposition on the sectional images includes:

Using a transfer learning-based downsampling network to downsample the input signals and output the downsampling results, i.e., performing initial feature extraction on digital sectional images of abnormal electrical resistivity, magnetization, velocity, and density, respectively, to obtain downsampling features at different scales for each image.

Preferably, performing feature enhancement on the sectional images includes:

Using Spearman correlation to calculate the correlation coefficients between the initial features at different scales for each image;

Removing irrelevant initial features based on the comparison results between the correlation coefficients and the coefficient threshold to obtain enhanced features.

Preferably, performing weighted fusion processing on the enhanced sectional images includes:

Calculating the initial weight matrices corresponding to each sectional image using local nuclear norm and average operations;

Performing interpolation operation on the initial weight matrices using the soft-max operation and bicubic interpolation to obtain the weight coefficients corresponding to each sectional image;

Using the local energy map algorithm to maintain the structural and detail information of each sectional image;

Using the similarity measurement as the fusion decision value and comparing the fusion results calculated by the local energy with the weighted average fusion rule.

Preferably, using Spearman correlation to calculate the correlation coefficients between the initial features at different scales for each image:

The Spearman correlation coefficient $$r_s^k$$

is used to represent the correlation between the initial features $$F_{i,1:M_i}^k$$

of the i-th layer convolution module outputting M channels.

$$r_s^k = 1 - \frac{6 \sum_{i=1}^{M} d^2}{M(M^2 - 1)}$$

where d is the rank difference between $$F_{i,p}^k$$

and $$F_{i,q}^k,$$

$p,q \in \{1,2,L,M_i\}$; k represents the image category number; the minimum number of features is selected with $$r_s^k$$

as the selected features after feature selection, represented by $$F_{i,1:C}^k.$$

Preferably, the ZCA algorithm is utilized for redundancy reduction on the secondary image features, to achieve enhancement of section image features, including:

calculating the covariance matrix $$Cov_{i,m}^k$$

of $$X = \left( F_{i,1}^k, F_{i,2}^k, L, F_{i,C}^k \right)$$

and perform singular value decomposition on the covariance matrix $$Cov_{i,m}^k$$

as follows:

$$Cov_{i,m}^k = F_{i,m}^k \times \left( F_{i,m}^k \right)^T, m \in \{1, 2, L, C\}$$

$$Cov_{i,m}^k = U \sum V^T$$

using the following equation to calculate the secondary extracted feature $$\overset{)}{F}_{i,1;C}^k : \overset{)}{F}_{i,1;C}^k = U \sqrt{\left( \sum + \varepsilon I \right)^{-1}} \, U^T F_{i,C}^k$$

where U and V are both unitary matrices satisfying $U^T U = I, V^T V = I$; $\Sigma$ represents a diagonal matrix, with all elements except the main diagonal being 0, and each element on the main diagonal is called a singular value. I represents an identity matrix, and $\varepsilon$ represents a minimum value for eliminating ill-conditioned matrices.

performing weighted fusion processing on the enhanced sectional images, comprising: calculating the initial weight matrix $$S_{i,*}^k$$

of the image using local nuclear norm and average operation according to the following formula:

$$S_{i,*}^k(x, y) = \frac{\sum_{p=x-t}^{p=x+t} \sum_{q=y-t}^{q=y+t} \left\| \overset{)}{F}_{i,1;C}^k(p, q) \right\|^*}{(2t + 1) \cdot (2t + 1)}$$

where $p,q = \in \{1,2,L,M_i\}$, x, and y represent the pixel coordinates, t represents the step size for iterating over all pixels, and k represents the image category number. The following equation is used to perform interpolation of the weight matrix using soft-max operation and bicubic interpolation to obtain weight coefficients $$\omega_i^k :$$

$$\omega_i^k(x, y) = \frac{S_{i,*}^k(x, y)}{S_{i,*}^1(x, y) + S_{i,*}^2(x, y)}, k \in \{1, 2\}$$

Considering the specificity and locality of underground targets, Local Energy Map is used to preserve the structural and detailed information of the image:

$$LE_k(x, y) = \sum_m \sum_n L\{I_k\}(i + m, y + n)^2$$

where $LE_k(x,y)$ represents the total energy map function, $L\{Ik\}$ represents the local energy map function, m×n represents the size of the neighbourhood, and the similarity measurement between $I_1$ and $I_2$ is calculated as the fusion decision value using the following equation:

$$M(x, y) = \frac{2 \prod_{k=1,2} \left( \sum_m \sum_n L\{I_k\}(x + m, y + n) \right)}{\sum_{k=1,2} LE_k(x, y)}$$

Let $M(x,y)=\in[-1,1]$ be the similarity measure between $I_1$ and $I_2$, where a value closer to 1 indicates a stronger similarity between the images. Set a threshold value T, if $M(x,y)<T$, then use the weighted averaging fusion rule to calculate the fusion result:

$$F_{M<T}(x, y) = \omega_i^1(x, y)I_1(x, y) + \omega_i^2(x, y)I_2(x, y)$$

If $M(x,y)\geq T$, then the fusion result is calculated by comparing the local energy:

$$F_{M\geq T}(x, y) = \begin{cases} L\{I_1\}(x, y), & \text{if } LE_1(x, y) \geq LE_2(x, y) \\ L\{I_2\}(x, y), & \text{if } LE_1(x, y) < LE_2(x, y) \end{cases}$$

The fusion strategy is represented as:

$$F(x, y) = \begin{cases} F_{M<T}(x, y), & \text{if } M(x, y) < T \\ F_{M\geq T}(x, y), & \text{if } M(x, y) \geq T \end{cases}$$

In the second aspect, the present invention also provides a transfer learning positioning device for igneous carbonate rock-derived rare earth ore, comprising:

An image acquisition module, set to acquire electrical, magnetic, seismic, and gravity exploration data of the area to be evaluated, and perform transfer learning positioning on the electrical, magnetic, seismic, and gravity exploration data to determine the cross-sectional view corresponding to the abnormal position of igneous carbonate rock-derived rare earth ore data in the area to be evaluated;

An image processing module, set to perform feature decomposition and dimensionality reduction, feature enhancement, and weighted fusion processing on the respective cross-sectional images;

A storage positioning module, set to segment the geological bodies of igneous carbonate rock-derived rare earth ore mineralization in the fusion image, and obtain the spatial storage morphology of the detection target.

Compared with the prior art, the igneous carbonate rock-derived rare earth ore transfer learning positioning method and device provided by the present invention comprehensively analyze multi-source geophysical data through images, and accurately identify and locate the target body under big data conditions. The accuracy is ensured while improving the efficiency of comprehensive interpretation.

BRIEF DESCRIPTION OF THE DRAWINGS

FIG. 1 is a schematic flowchart of the igneous carbonate rock-derived rare earth ore transfer learning positioning method of an embodiment of the present invention;

FIG. 3 is a schematic diagram of feature extraction, feature dimensionality reduction, and feature enhancement from a single SI image according to an embodiment of the present invention;

FIG. 4 is a schematic diagram of the establishment process of the weight matrix according to an embodiment of the present invention;

FIG. 5 is a schematic diagram of transfer learning according to an embodiment of the present invention;

DETAILED DESCRIPTION

Figure 2:
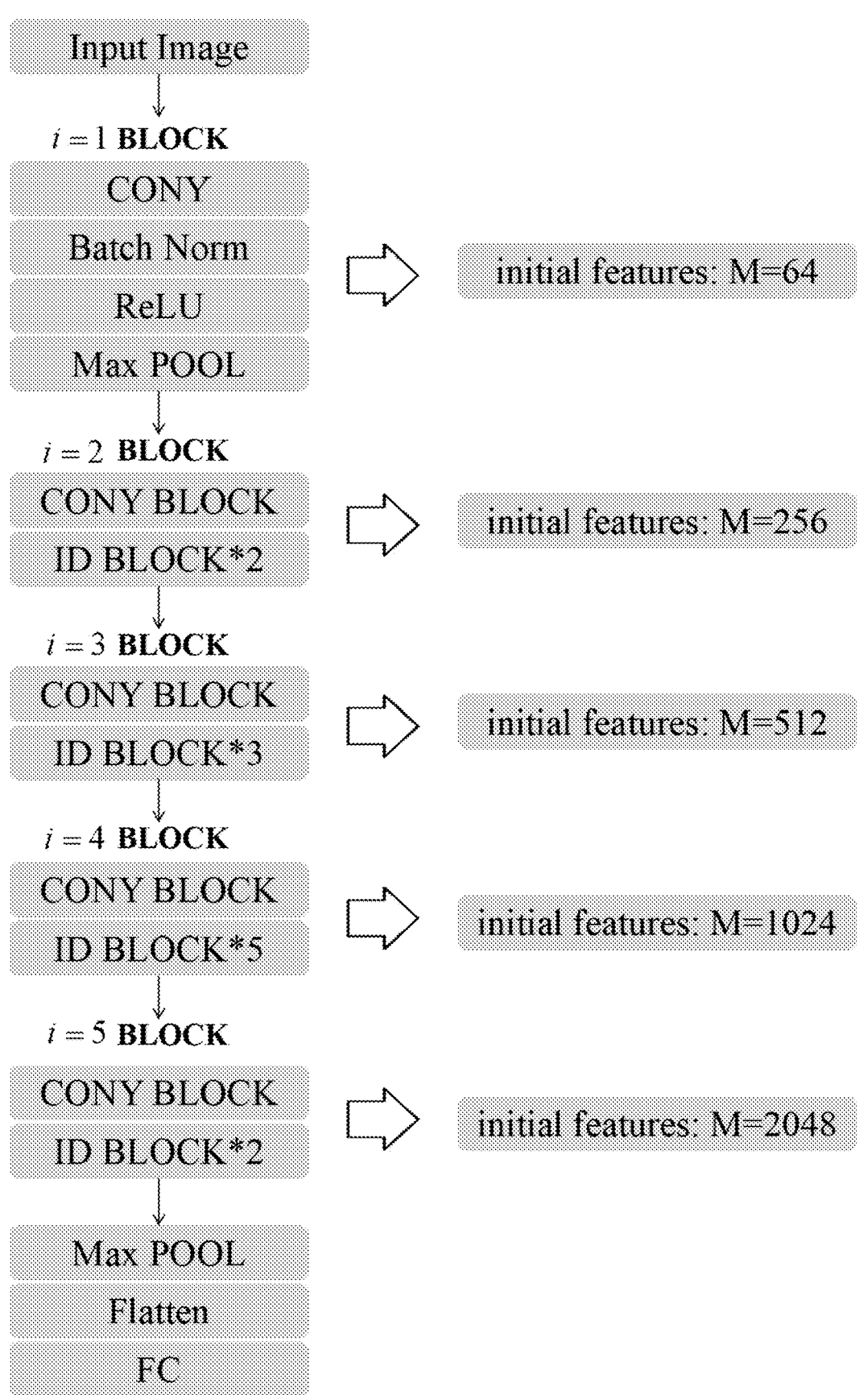
FIG. 2 is a schematic flowchart of feature extraction of a single input image according to an embodiment of the present invention.

In order to make the purpose, technical scheme, and beneficial effects of the present invention clearer and more comprehensible, the embodiments of the present invention will be described below in conjunction with the accompanying drawings. It should be noted that, in the absence of conflict, the features in the embodiments of the present application can be combined with each other in any manner.

As shown in FIG. 1, the embodiment of the present invention provides an igneous carbonate rock-derived rare earth ore transfer learning positioning method, including:

S101, acquiring electrical, magnetic, seismic, and gravity exploration data of the area to be evaluated, and performing transfer learning positioning on the electrical, magnetic, seismic, and gravity exploration data to determine the cross-sectional view corresponding to the abnormal position of igneous carbonate rock-derived rare earth ore data in the area to be evaluated;

S102, performing feature decomposition and dimensionality reduction, feature enhancement, and weighted fusion processing on the respective cross-sectional images;

S103, segmenting the geological bodies of igneous carbonate rock-derived rare earth ore mineralization in the fusion image, and obtaining the spatial storage morphology of the detection target.

In the embodiments of the present invention, transfer learning-based positioning of electrical, magnetic, seismic, and gravity exploration data includes:

Analyzing the electrical, magnetic, seismic, and gravity exploration data to obtain the data volumes corresponding to the electrical resistivity anomalies, magnetization anomalies, velocity anomalies, and density anomalies of igneous carbonate-hosted rare earth ore genesis; and positioning the data volumes corresponding to the electrical resistivity anomalies, magnetization anomalies, velocity anomalies, and density anomalies.

In the embodiments of the present invention, the sectional images corresponding to the data anomalies include: a digital sectional image of electrical resistivity anomalies, a digital sectional image of magnetization anomalies, a digital sectional image of velocity anomalies, and a digital sectional image of density anomalies.

In the embodiments of the present invention, electrical, magnetic, seismic, and gravity exploration data are obtained in the target area, and then transfer learning-based positioning is performed based on the data.

In the embodiments of the present invention, determining the sectional images corresponding to the data anomaly locations of igneous carbonate-hosted rare earth ore genesis in the target area includes:

Generating digital sectional images of electrical resistivity anomalies, magnetization anomalies, velocity anomalies, and density anomalies with the same depth, respectively;

Configuring the data of the digital sectional images of electrical resistivity anomalies, magnetization anomalies, velocity anomalies, and density anomalies on a common coordinate system.

In the embodiments of the present invention, feature decomposition and dimension reduction, feature enhancement, and weighted fusion processing of the sectional images can be understood as image feature decomposition, image feature dimension reduction, and image feature enhancement processing of the sectional images, respectively, and the processed sectional images are weighted and fused.

In the embodiments of the present invention, feature decomposition and dimension reduction of the sectional images include: using a transfer learning-based downsampling network to downsample the input signal, outputting the downsampling result, i.e., performing initial feature extraction on the digital sectional images of electrical resistivity anomalies, magnetization anomalies, velocity anomalies, and density anomalies, obtaining the downsampling features at different scales for each image.

In the embodiments of the present invention, by analyzing the electrical, magnetic, seismic, and gravity exploration data obtained in the target area, the data volumes corresponding to the electrical resistivity anomalies, magnetization anomalies, velocity anomalies, and density anomalies of igneous carbonate-hosted rare earth ore genesis are obtained, and then transfer learning-based positioning is performed on the electrical, magnetic, seismic, and gravity exploration data volumes to determine the location of the igneous carbonate-hosted rare earth ore genesis in the target area through multi-source information fusion technology.

In the embodiments of the present invention, image feature decomposition of the sectional images includes:

Using the transfer learning-based network ResNet50 to perform initial feature extraction on the digital sectional images of electrical resistivity anomalies, magnetization anomalies, velocity anomalies, and density anomalies, and obtaining M initial features for each image.

As shown in FIG. 2, an example is given to illustrate the number of image features M extracted by the fixed network ResNet50 of transfer learning at different convolutional layers i (i=1,2,3,4,5) for a given input image. The i-th convolutional module outputs M channels of features denoted by $$F_{i,1:M_i}^k,$$

where i∈{1,2,3,4,5}, and k represents the category number of the input image. For example, $$F_{i,1:M_i}^k,$$

represents 1024 channels of features extracted by ResNet50's fixed network at the 4th convolutional module for input image I1, which can also be understood as 1024 features extracted from the image.

In the embodiments of the present invention, the feature enhancement processing of the sectional image includes:

For each image, calculating the correlation coefficients between the initial features at different scales using Spearman correlation;

Removing the irrelevant initial features based on the comparison results between the correlation coefficients and the threshold, and obtaining the enhanced features.

In the embodiments of the present invention, the image feature dimension reduction and enhancement processing of the sectional image include:

For the M initial features of each image, calculating the correlation coefficients between the initial features using Spearman correlation;

Removing the irrelevant initial features based on the comparison results between the correlation coefficients and the threshold, and obtaining the secondary image features after dimensionality reduction;

Using the ZCA algorithm to perform redundancy reduction on the secondary image features to achieve feature enhancement of the sectional image.

As shown in FIG. 3, the embodiments of the present invention provide a process diagram of single SI image feature extraction, feature dimension reduction, and feature enhancement. (a) The source image SI is a contour map of resistivity; (b) The input image I after preprocessing; (c) A series of initial features extracted from I (using the ResNet50 fixed network), here showing the features with 1024 channels output from the 4th convolution layer (i=4). (d) The correlation coefficients between the initial features calculated using Spearman correlation. (e) The secondary features after dimensionality reduction. The irrelevant features are removed based on the correlation coefficients, where the embodiments of the present invention consider the features with correlation coefficients <0.3 as irrelevant. (f) An example of a feature in (e), here showing the 525th feature in the 4th convolution module. (g) The feature after enhancement, where the ZCA algorithm is used for redundancy reduction to achieve feature enhancement.

In the embodiments of the present invention, the enhanced sectional images are weighted and fused, including:

Calculating the initial weight matrix for each sectional image using local Nuclear Norm and average operation;

Interpolating the initial weight matrix using soft-max operation and bicubic interpolation to obtain the weight coefficients for each sectional image;

Using the Local energy map algorithm to preserve the structural and detail information of each sectional image;

Using similarity measurement as the decision value for fusion, comparing the fusion results calculated by weighted averaging with local energy calculation.

The embodiments of the present invention also include calculating the correlation coefficients between the initial features at different scales for each image using Spearman correlation:

The Spearman correlation coefficient $$r_s^k$$

is used to represent the correlation between the initial features $$F_{i,1:M_i}^k$$

of the i-th layer convolution module outputting M channels.

$$r_s^k = 1 - \frac{6 \sum_{i=1}^{M} d^2}{M(M^2 - 1)}$$

where d is the rank difference between $$F_{i,p}^k$$

and $$F_{i,q}^k,$$

$p, q \in \{1, 2, L, M_i\}$; k represents the image category number; the minimum number of features is selected with $$r_s^k$$

as the selected features after feature selection, represented by $$F_{i,1:C}^k.$$

In the present embodiment of the invention, four source images SI (SI1, SI2, SI3, and SI4) are used, which are digitized sections of anomalies in resistivity, magnetization, velocity, and density, respectively. After preprocessing, four input images I (I1, I2, I3, and I4) are obtained. Then, the ResNet50 transfer learning network is used to extract initial features from the four input images respectively.

In this embodiment of the invention, ZCA algorithm is used to remove redundancy from the secondary image features, achieving enhancement of the section image features:

calculating the covariance matrix $$Cov_{i,m}^k \text{ of } X = \left(F_{i,1}^k, F_{i,2}^k, L, F_{i,C}^k\right)$$

and perform singular value decomposition on the covariance matrix $$Cov_{i,m}^k$$

as follows:

$$\mathrm{Cov}_{i,m}^k = F_{i,m}^k \times \left(F_{i,m}^k\right)^T, \ m \in \{1, 2, L, C\}$$

$$\mathrm{Cov}_{i,m}^k = U \Sigma V^T$$

using the following equation to calculate the secondary extracted feature $$\overset{)}{F}_{i,1:C}^k : \overset{)}{F}_{i,1:C}^k = U \sqrt{(\Sigma + \varepsilon I)^{-1}} \, U^T F_{i,C}^k$$

where U and V are both unitary matrices satisfying $U^T U = I, V^T V = I$; $\Sigma$ represents a diagonal, matrix, with all elements except the main diagonal being 0, and each element on the main diagonal is called a singular value. I represents an identity matrix, and $\varepsilon$ represents a minimum value for eliminating ill-conditioned matrices.

1) Image Feature Dimensionality Reduction

After ResNet50 network extracts features, the features are high-dimensional, and redundant features inevitably exist. In order to improve the efficiency of the algorithm, the embodiments of the present invention propose to use Spearman correlation coefficient (Gibbs 2015) to reduce the dimensionality of the initial features and remove correlated features.

The redundant features in the initial features $$F_{i,1:M_i}^k$$

output by the third layer convolution module are removed by using the Spearman correlation coefficient, i.e., feature dimensionality reduction. It should be noted that the dimensionality reduction here is a process of feature selection, the number of features will decrease, but each feature matrix will not undergo any changes (FIG. 3(c)-(e)). The Spearman correlation coefficient of the initial features $$F_{i,1:M_i}^k$$

output by the third layer module is represented by $$r_s^k:$$

$$r_s^k = 1 - \frac{6 \sum_{i=1}^{M} d^2}{M(M^2 - 1)} \tag{1}$$

where d is the rank difference between $$F_{i,p}^k$$

and $$F_{i,q}^k,$$

$p,q \in \{1,2,L,M_i\}$. When $|r_s| \to 1$, $$F_{i,p}^k$$

and $$F_{i,q}^k$$

are more correlated; when $|r_s| \to 0$, $$F_{i,p}^k$$

and $$F_{i,q}^k$$

are considered unrelated. The $r_s$ is used to select the unrelated features, and at this point, multiple combinations will be obtained. The embodiments of the present invention select the group with the smallest number of features as the feature selected after feature selection, which is represented by $$F_{i,1:C}^k.$$

2) Image Feature Enhancement

Due to the ambiguity of single features, it can affect the image fusion effect. Therefore, this patent uses zero-phase component analysis (ZCA) for feature enhancement (Whitening). ZCA is commonly used to process image data, especially when using convolutional neural networks. After the image is whitened by ZCA, it will rotate back to the original pixel space, and the neighboring features of the image can still maintain the original feature structure after being whitened by ZCA. Therefore, the whitened image and the original image will be as similar as possible, and the convolutional neural network needs to use the information between pixels (Ren et al. 2021; Sheng et al. 2018). The following describes the operation process of the ZCA algorithm. First, calculate the covariance matrix $$Cov_{i,m}^k \text{ of } X = \left(F_{i,1}^k, F_{i,2}^k, L, F_{i,C}^k\right)$$

according to equation (2) and perform singular value decomposition on $$Cov_{i,m}^k:$$

$$Cov_{i,m}^k = F_{i,m}^k \times \left(F_{i,m}^k\right)^T, \ m \in \{1, 2, L, C\} \qquad (2)$$

$$Cov_{i,m}^k = U\Sigma V^T$$

Then, in the embodiment of the present invention, the second extracted feature $$\overset{)}{F}_{i,1:C}^k$$

(FIG. 2 (e)~(g)) is obtained using equation (3).

$$\overset{)}{F}_{i,1:C}^k = U\sqrt{(\Sigma + \varepsilon I)^{-1}} \ U^T F_{i,C}^k \qquad (3)$$

Where U and V are unitary matrices, and $U^T U=I, V^T V=I$ satisfies; $\Sigma$ represents a diagonal matrix, except that all elements except the main diagonal are 0, and each element on the main diagonal is called a singular value. I represents the identity matrix, and $\varepsilon$ represents a small value avoiding bad matrix inversion to eliminate ill-conditioned matrices.

In the embodiment of the present invention, the enhanced section image is subjected to weighted fusion processing, including:

The initial weight matrix $$S_{i,*}^k$$

of the image is calculated using local nuclear norm and average operation by the following equation:

$$S_{i,*}^k(x, y) = \frac{\sum\limits_{p=x}^{p=x+t} \sum\limits_{q=y-t}^{q=y+t} \left\| \overset{)}{F}_{i,1:C}^k(p, q) \right\|^*}{(2t+1)\cdot(2t+1)}$$

Where $p,q \in \{1,2,L,M_i\}$, x,y represent the coordinates of the pixel, t represents the step size when calculating the sum of each pixel, and k represents the image category number.

The weight coefficient matrix $$\omega_i^k$$

is obtained by interpolating the weight matrix using softmax operation and bilinear interpolation with the following equation:

$$\omega_i^k(x, y) = \frac{S_{i,*}^k(x, y)}{S_{i,*}^1(x, y) + S_{i,*}^2(x, y)}, \ k \in \{1, 2\}$$

Consider the specificity and local characteristics of underground targets and use the local energy map to preserve the structural and detailed information of the image:

$$LE_k(x, y) = \sum_m \sum_n L\{I_k\}(x + m, y + n)^2$$

where $LE_k(x,y)$ represents the total energy map function, $L\{Ik\}$ represents the local energy map function, $m \times n$ represents the size of the neighborhood, and the similarity measurement between $I_1$ and $I_2$ is used as the fusion decision value calculated by the following equation:

$$M(x, y) = \frac{2 \prod\limits_{k=1,2} \left( \sum\limits_m \sum\limits_n L\{I_k\}(x+m, y+n) \right)}{\sum\limits_{k=1,2} LE_k(x, y)},$$

where the closer $M(x,y)=\in [-1,1]$ is to 1, the stronger the similarity between the images.

If $M(x,y)<T$, the fusion result is calculated using the weighted average fusion rule:

$$F_{M<T}(x, y) = \omega_i^1(x, y)I_1(x, y) + \omega_i^2(x, y)I_2(x, y)$$

Otherwise, the fusion result is calculated by comparing the local energy:

$$F_{M \geq T}(x, y) = \begin{cases} L\{I_1\}(x, y), & \text{if } LE_1(x, y) \geq LE_2(x, y) \\ L\{I_2\}(x, y), & \text{if } LE_1(x, y) < LE_2(x, y) \end{cases}$$

The fusion strategy is represented by:

$$F(x, y) = \begin{cases} F_{M<T}(x, y), & \text{if } M(x, y) < T \\ F_{M \geq T}(x, y), & \text{if } M(x, y) \geq T \end{cases}$$

The process of establishing the weight matrix is shown in (a) the final feature of I1, (b) the initial weight matrix $$S_{i,*}^1,$$

(c) the final weight matrix of I1, (d) the final feature of I2, (e) the initial weight matrix $$S_{i,*}^2,$$

and (f) the final weight matrix of I2.

After the image feature extraction process is completed, the next step is to fuse multiple sources of geophysical images. In this patent, the extracted features are considered as the fusion weights to achieve adaptive image fusion. For a series of image features related to underground structures, there must be correlation between the rows of the matrix. Generally, the matrix is low-rank, so this invention uses nuclear norm to solve the problem of low-rank reconstruction and obtain the initial weight matrix of the image. In this implementation, local nuclear norm and average operation are used to calculate the initial weight matrix $$S_{i,*}^k$$

of the image, as shown in equation (4):

$$S_{i,*}^k(x, y) = \frac{\sum\limits_{p=x-t}^{p=x+t} \sum\limits_{q=y-t}^{q=y+t} \left\| F_{i,1:C}^k(p, q) \right\|_*}{(2t+1) \cdot (2t+1)} \tag{4}$$

As shown in FIG. 4, the window size in this patent is set to 2. At this point, the initial weight matrix of the image is obtained. However, there is a difference in size between the initial weight matrix obtained after the source image is subjected to convolution and downsampling and the size of the original image. Therefore, this patent uses soft-max operation and bilinear interpolation to interpolate the weight matrix to obtain the final weight coefficient matrix $$\omega_i^k,$$

as shown in equation (5):

$$\omega_i^k(x, y) = \frac{S_{i,*}^k(x, y)}{S_{i,*}^1(x, y) + S_{i,*}^2(x, y)}, k \in \{1, 2\} \tag{5}$$

Considering the specificity and local characteristics of underground targets, we propose to use the Local Energy Map (LE) (Qiu et al. 2016) to preserve the structural and detailed information of the image. The definition of LE is shown in Equation (6):

$$LE_k(x, y) = \sum\limits_m \sum\limits_n L\{I_k\}(x+m, y+n)^2 \tag{6}$$

Where $m \times n$ represents the size of the neighborhood. The similarity measurement between $I_1$ and $I_2$ is used as the decision value for fusion and calculated using Equation (7):

$$M(x, y) = \frac{2 \prod\limits_{k=1,2} \left( \sum\limits_m \sum\limits_n L\{I_k\}(x+m, y+n) \right)}{\sum\limits_{k=1,2} LE_k(x, y)} \tag{7}$$

If $M(x,y) \in [-1,1]$ tends towards 1, it indicates a strong similarity between the images. A threshold value T is set, and if $M(x,y)<T$ is greater than T, the fusion result is calculated using the weighted average fusion rule, as shown in Equation (8):

$$F_{M<T}(x, y) = \omega_i^1(x, y)I_1(x, y) + \omega_i^2(x, y)I_2(x, y) \tag{8}$$

If $M(x,y) \geq T$ is less than or equal to T, the fusion result is calculated by comparing the local energy using Equation (9):

$$F_{M \geq T}(x, y) = \begin{cases} L\{I_1\}(x, y), & \text{if } LE_1(x, y) \geq LE_2(x, y) \\ L\{I_2\}(x, y), & \text{if } LE_1(x, y) < LE_2(x, y) \end{cases} \tag{9}$$

Therefore, the fusion strategy can be shown in Equation (10):

$$F(x, y) = \begin{cases} F_{M<T}(x, y), & \text{if } M(x, y) < T \\ F_{M \geq T}(x, y), & \text{if } M(x, y) \geq T \end{cases} \tag{10}$$

$$\text{or } F(x, y) = \begin{cases} \omega_i^1(x, y)I_1(x, y) + \omega_i^2(x, y)I_2(x, y), & \text{if } M(x, y) < T \\ \frac{1}{2}(I_1(x, y) + I_2(x, y)), & \text{if } M(x, y) \geq T \end{cases}$$

In this patent, the value of T=0.9 is set to 9. The final fusion result was determined by comparing the fusion results at different T values with prior information.

In the present embodiment of the invention, the abnormal resistivity data body, abnormal magnetization data body, abnormal velocity data body, and abnormal density data body are respectively used to generate digital cut-out maps with the same depth of abnormal resistivity, abnormal magnetization, abnormal velocity, and abnormal density. The data of the digital cut-out maps of abnormal resistivity, abnormal magnetization, abnormal velocity, and abnormal density are configured on a common coordinate system to form a first registration color image and a second registration color image. The first and second registration color images are pre-processed to form a first source image and a second source image. The four images are decomposed into low-frequency sub-band images and high-frequency sub-band images. The two low-frequency sub-band images are fused, and the two high-frequency sub-band images are fused. The fused low-frequency sub-band image and the fused high-frequency sub-band image are reconstructed. The geological bodies in the fused image are segmented using a segmentation method, and the spatial morphology of the detection target is obtained. The present invention identifies geological targets using images as carriers to comprehensively analyze multi-source geophysical data, realizes accurate identification and positioning of target bodies under big data conditions, and can improve the efficiency of comprehensive interpretation while ensuring accuracy.

The present embodiment of the invention also provides a positioning device for the migration learning of igneous carbonate rock-origin rare earth minerals, including:

An image acquisition module is configured to obtain electrical, magnetic, seismic, and gravity exploration data of the area to be estimated and to perform migration learning positioning on the electrical, magnetic, seismic, and gravity exploration data to determine the cut-out map corresponding to the abnormal location of the igneous carbonate rock-origin rare earth mineral data in the area to be estimated.

An image processing module is configured to perform feature decomposition and dimension reduction, feature enhancement, and weighted fusion processing on the cut-out maps, respectively.

A storage and positioning module is configured to segment the igneous carbonate rock-origin rare earth mineralized geological bodies in the fused image and obtain the spatial morphology of the detection target.

Implementation Example

The test was conducted using the method and device for transfer learning-based rare earth mineral localization described in the embodiments of the present invention. Bayan Obo is the largest rare earth mine in the world, which has experienced compression tectonic effects, including the development of conglomerate pancake structures, mylonitization, and folding, transforming the horizontal stratigraphic structure into steep structural bedding with an E-W trend. The compressed structures were invaded by carbonate rocks, indicating that they formed before the formation of carbonate rocks and provided a favorable pathway for magma upwelling.

The main body of the carbonate rock is distributed parallel to the east-west direction, and the veins are distributed in the NE direction, forming a characteristic of a serial arrangement, indicating that the carbonate rocks intruded in a strike-slip environment. The sponge meteorite structure shows that the magnetite is magma iron, and the spatial distribution of the mineral-containing dolomite is unclear due to the unclear intrusion center of the magma.

The bedding and fold axis orientations in the Bayan Obo mining area are 120-100°, 50-70°, and E-W direction. Shear zones are developed in carbonate rocks, including eyeball-shaped structures with NW and NE directions, and conjugate folds and shear zones indicate the compression in the north-south direction. The structural style after the intrusion of carbonate rocks is conjugate, and there is no significant displacement between mining areas, indicating near-in-situ tectonics.

The formation and mineralization processes of the Bayan Obo deposit were divided into four mineralization periods (Middle Paleozoic and Paleozoic). The mineralization process is divided from early to late into magmatic period (coarse-grained dolomite), magmatic-hydrothermal period (fine-grained dolomite), hydrothermal period (impregnation, banded and massive mineralization), and early Paleozoic superimposed alteration period (vein mineralization). The formation and mineralization process of the Bayan Obo deposit is characterized by the interaction of melt-fluid derived from carbonatite magma with the carbonate rock body and surrounding rocks. It has been confirmed that the rare earth resource amount is 5570 T with an average grade of 5.6%.

The ore body is a thick and large lens body produced in the contact zone. However, the mineral composition is complex, and the spatial output is irregular, making it difficult to locate the ore body in space. In this implementation example, the transfer learning modeling was performed using the measured electromagnetic detection, magnetic, and gravity exploration data of the Bayan Obo rare earth deposit. The data set includes electrical exploration data, magnetic exploration data, seismic data, and gravity exploration data.

Transfer learning refers to training a basic network with strong feature extraction ability on a large data set and then transferring the network to a task of multi-source geophysical image fusion. Transfer learning aims to solve the problem of lack of label data or difficult access to label data in the target field using existing experience.

Figure 6:
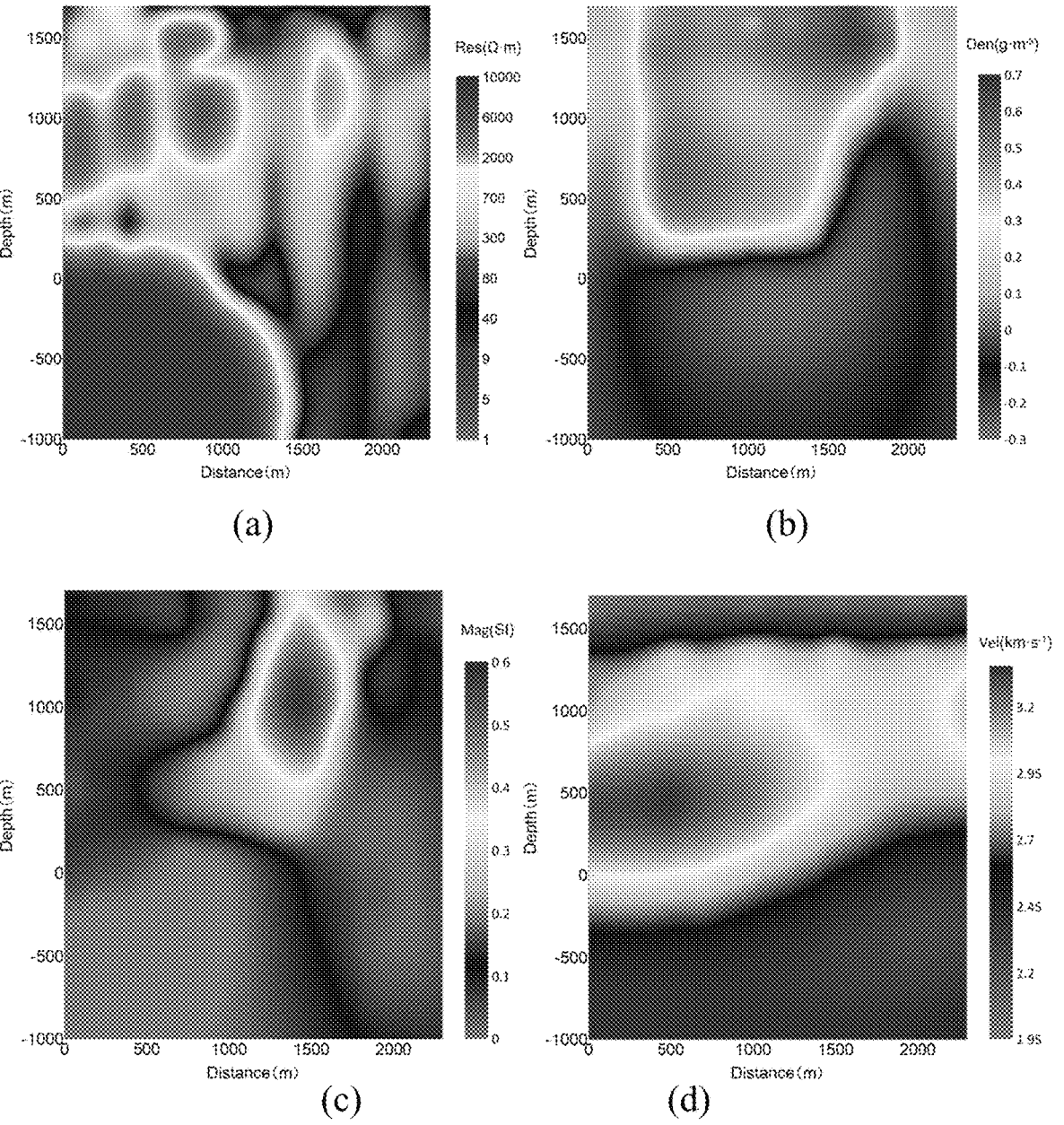
FIG. 6 is a schematic diagram of the cross-sectional view of an embodiment of the present invention, wherein FIG. 6(*a*) is a resistivity image, FIG. 6(*b*) is a density image, FIG. 6(*c*) is a magnetization image, and FIG. 6(*d*) is a velocity image.

In the target evaluation area, electrical, magnetic, seismic, and gravity exploration data were obtained, and the obtained electrical exploration data, magnetic exploration data, seismic exploration data, and gravity exploration data were processed to obtain FIG. 6(a) resistivity image, FIG. 6(b) density image, FIG. 6(c) magnetic susceptibility image, and FIG. 6(d) velocity image. The images in FIG. 6 reflect inconsistent positions of underground target bodies, mainly due to the multi-solution nature of a single geophysical image.

Figure 7:
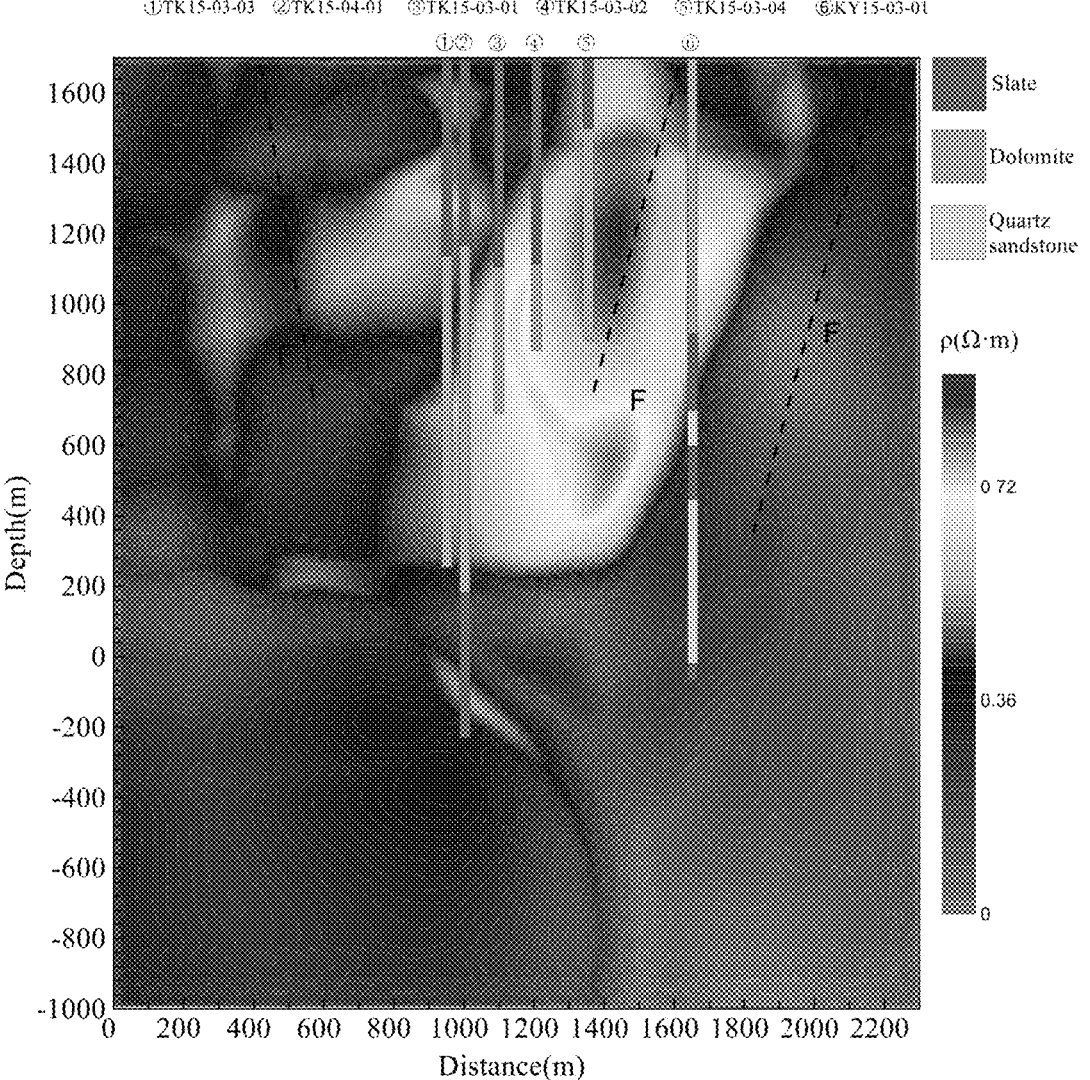
FIG. 7 is a schematic diagram of the transfer learning result of an embodiment of the present invention.

Based on the results of rock physical property tests in the area, including minerals, dolomite has the characteristics of high resistance, high magnetic susceptibility, high density, and high velocity. The fusion coefficient in the fusion results represents the distribution range of dolomite, with high coefficient values indicating the distribution of dolomite. According to the drilling results, when the fusion coefficient is greater than 0.5, it represents the dolomite, as shown in the green, yellow, and red areas in the figure. This result (FIG. 7) is consistent with the range of dolomite revealed by the six boreholes in the profile.

Although the embodiment of the present invention is described above, it is for the purpose of facilitating understanding of the technical solution of the present invention and is not intended to limit the present invention. Any modifications and changes in form and detail that fall within the scope of the core technical solutions disclosed in the present invention are within the knowledge of those skilled in the art of the relevant technology, but the scope of protection defined by the appended claims shall still prevail.

The invention claimed is:

1. A transfer learning positioning method for igneous carbonate-type rare earth mineralization, comprising:

acquiring electrical, magnetic, seismic, and gravity exploration data for a target area;

performing transfer learning positioning on the electrical, magnetic, seismic, and gravity exploration data to determine a cross-sectional image corresponding to an abnormal position of the electrical, magnetic, seismic, and gravity exploration data associated with an igneous carbonate-type rare earth mineralization in the target area;

performing feature decomposition and dimension reduction, feature enhancement, and weighted fusion processing on the cross-sectional image;

segmenting a spatial occurrence form of the igneous carbonate-type rare earth mineralized geological body in the cross-sectional image after the weighted fusion processing to obtain a spatial occurrence form of the igneous carbonate-type rare earth mineralized geological body in the target area;

wherein the transfer learning positioning of the electrical, magnetic, seismic, and gravity exploration data comprises:

analyzing the electrical, magnetic, seismic, and gravity exploration data to obtain data volumes corresponding to electrical resistivity anomalies, magnetization anomalies, velocity anomalies, and density anomalies for igneous carbonate-type rare earth mineralization; and performing location identification on the data volumes corresponding to the electrical resistivity anomalies, magnetization anomalies, velocity anomalies, and density anomalies, respectively; and wherein the cross-sectional image corresponding to the location identification of the respective anomalies comprises:

a digital cross-sectional image of the electrical resistivity anomaly, a digital cross-sectional image of the magnetization anomaly, a digital cross-sectional image of the velocity anomaly, and a digital cross-sectional image of the density anomaly.

2. The method according to claim 1, wherein determining the cross-sectional image corresponding to the abnormal position of the data for the igneous carbonate-type rare earth mineralization in the target area comprises:

generating digital cross-sectional images of electrical resistivity anomaly, magnetization anomaly, velocity anomaly, and density anomaly at the same depth for the data volumes corresponding to electrical resistivity anomalies, magnetization anomalies, velocity anomalies, and density anomalies, respectively;

configuring the digital cross-sectional images of the electrical resistivity anomaly, magnetization anomaly, velocity anomaly, and density anomaly in a common coordinate system.

3. The method according to claim 1, wherein performing feature decomposition and dimension reduction on the cross-sectional image comprises:

using a transfer learning selection network to perform stepwise dimension reduction on the input signal and output the reduced feature, performing initial feature extraction on the digital cross-sectional images of the electrical resistivity anomaly, magnetization anomaly, velocity anomaly, and density anomaly, respectively, to obtain reduced features at different scales for each image.

4. The method according to claim 3, wherein performing feature enhancement on the cross-sectional image comprises:

calculating the initial feature correlation coefficient between different scales of reduced features using Spearman correlation for each image;

removing irrelevant initial features based on the comparison result between the correlation coefficient and the coefficient threshold to obtain enhanced features.

5. The method according to claim 4, wherein performing weighted fusion processing on the enhanced cross-sectional image comprises:

calculating an initial weight matrix corresponding to each cross-sectional image using the local nuclear norm and average operation;

performing interpolation operation using the soft-max operation and bicubic interpolation on the initial weight matrix to obtain weight coefficients corresponding to each cross-sectional image;

maintaining the structural information and detail information of each cross-sectional image using the a local energy map algorithm;

using similarity measurement as a fusion decision value and using a weighted averaging fusion rule to compare the fusion results calculated by the local energy calculation.

6. Method as claimed in claim 4, characterized in that for each image at different scales, the initial feature correlation calculated using Spearman correlation includes:

The Spearman correlation coefficient of the initial features of M output channels of the i-th layer convolution module is used to represent:

The Spearman correlation coefficient $$r_s^k$$

is used to represent the correlation between the initial features $$F_{i,1:M_i}^k$$

of the i-th layer convolution module outputting M channels, $$r_S^k = 1 - \frac{6 \sum_{i=1}^{M} d^2}{M(M^2 - 1)}$$

where d is the rank difference between $$F_{i,p}^k \text{ and } F_{i,q}^k,$$

p,q∈{1,2,L,$M_i$}; k represents the image category number; the minimum number of features is selected with $$r_s^k$$

as the selected features after feature selection, represented by $$F_{i,1:C}^k.$$

7. The method as described in claim 5, characterized by: performing weighted fusion processing on the enhanced sectional images, comprising: calculating the initial weight matrix $$S_{i,*}^k$$

of the image using local nuclear norm and average operation according to the following formula:

$$S_{i,*}^k(x, y) = \frac{\sum_{p=x-t}^{p=x+t} \sum_{q=y-t}^{q=y+t} \left\| F_{i,1:C}^k(p, q) \right\|^*}{(2t + 1) \cdot (2t + 1)}$$

where p,q∈{1,2,L,$M_i$}, x, and y represent the pixel coordinates, t represents the step size for iterating over all pixels, and k represents the image category number, The following equation is used to perform interpolation of the weight matrix using soft-max operation and bicubic interpolation to obtain weight coefficients $$\omega_i^k:$$

$$\omega_i^k(x, y) = \frac{S_{i,*}^k(x, y)}{S_{i,*}^1(x, y) + S_{i,*}^2(x, y)}, k \in \{1, 2\}$$

Considering the specificity and locality of underground targets, Local Energy Map is used to preserve the structural and detailed information of the image:

$$LE_k(x, y) = \sum_m \sum_n L\{I_k\}(x + m, y + n)^2$$

where $LE_k(x,y)$ represents the total energy map function, L{Ik} represents the local energy map function, m×n represents the size of the neighbourhood, and the similarity measurement between $I_1$ and $I_2$ is calculated as the fusion decision value using the following equation:

$$M(x, y) = \frac{2 \prod_{k=1,2} \left( \sum_m \sum_n L\{I_k\}(x + m, y + n) \right)}{\sum_{k=1,2} LE_k(x, y)}$$

Let M(x,y)∈[−1,1] be the similarity measure between $I_1$ and $I_2$, where a value closer to 1 indicates a stronger similarity between the images, Set a threshold value T, if M(x,y)<T, then use the weighted averaging fusion rule to calculate the fusion result:

$$F_{M<T}(x, y) = \omega_i^1(x, y)I_1(x, y) + \omega_i^2(x, y)I_2(x, y)$$

If M(x,y)≥T, then the fusion result is calculated by comparing the local energy:

$$F_{M \geq T}(x, y) = \begin{cases} L\{I_1\}(x, y), & \text{if } LE_1(x, y) \geq LE_2(x, y) \\ L\{I_2\}(x, y), & \text{if } LE_1(x, y) < LE_2(x, y) \end{cases}$$

The fusion strategy is represented as:

$$F(x, y) = \begin{cases} F_{M<T}(x, y), & \text{if } M(x, y) < T \\ F_{M \geq T}(x, y), & \text{if } M(x, y) \geq T \end{cases}.$$

* * * * *